US012614755B2

(12) United States Patent
Tsay et al.

(10) Patent No.: US 12,614,755 B2
(45) Date of Patent: Apr. 28, 2026

(54) NON-AQUEOUS ELECTROLYTE FOR RECHARGEABLE LITHIUM BATTERY AND RECHARGEABLE LITHIUM BATTERY COMPRISING SAME

(71) Applicant: SAMSUNG SDI CO., LTD., Yongin-si (KR)

(72) Inventors: Olga Tsay, Yongin-si (KR); Yeji Yang, Yongin-si (KR); Sangwoo Park, Yongin-si (KR); Sundae Kim, Yongin-si (KR); Pavel Shatunov, Yongin-si (KR); Hyunbong Choi, Yongin-si (KR); Hongryeol Park, Yongin-si (KR); Hyeonji Hwang, Yongin-si (KR); Dahyun Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 515 days.

(21) Appl. No.: 18/003,690

(22) PCT Filed: Apr. 4, 2022

(86) PCT No.: PCT/KR2022/004778
§ 371 (c)(1),
(2) Date: Dec. 28, 2022

(87) PCT Pub. No.: WO2023/096036
PCT Pub. Date: Jun. 1, 2023

(65) Prior Publication Data

US 2024/0120538 A1 Apr. 11, 2024

(30) Foreign Application Priority Data

Nov. 26, 2021 (KR) ........................ 10-2021-0166123

(51) Int. Cl.
*H01M 10/0567* (2010.01)
*H01M 4/02* (2006.01)
(Continued)

(52) U.S. Cl.
CPC .. *H01M 10/0567* (2013.01); *H01M 2004/021* (2013.01); *H01M 2004/027* (2013.01);
(Continued)

(58) Field of Classification Search
CPC ........................................... H01M 10/05–0569
See application file for complete search history.

(56) References Cited

U.S. PATENT DOCUMENTS

2014/0145105 A1 5/2014 Jang et al.
2016/0118686 A1 4/2016 Kim et al.
2017/0288268 A1 10/2017 Kim et al.

FOREIGN PATENT DOCUMENTS

JP 09-171839 A 6/1997
JP 2009-259472 A 11/2009
(Continued)

OTHER PUBLICATIONS

Han et al. Solid State Ionics 337 (2019) 63-69. (Year: 2019).*
(Continued)

*Primary Examiner* — Jonathan G Leong
(74) *Attorney, Agent, or Firm* — Womble Bond Dickinson (US) LLP

(57) ABSTRACT

Provided are a non-aqueous electrolyte for a lithium secondary battery and a lithium secondary battery including the same, and the non-aqueous electrolyte for the lithium secondary battery including a non-aqueous organic solvent, a lithium salt, and an additive represented by Chemical Formula 1.

13 Claims, 1 Drawing Sheet

(51) Int. Cl.

| | |
|---|---|
| *H01M 4/133* | (2010.01) |
| *H01M 4/134* | (2010.01) |
| *H01M 4/38* | (2006.01) |
| *H01M 4/587* | (2010.01) |
| *H01M 10/052* | (2010.01) |

(52) U.S. Cl.
CPC ............ *H01M 4/133* (2013.01); *H01M 4/134* (2013.01); *H01M 4/386* (2013.01); *H01M 4/587* (2013.01); *H01M 10/052* (2013.01)

(56) References Cited

FOREIGN PATENT DOCUMENTS

| | | | |
|---|---|---|---|
| KR | 10-2014-0069410 | A | 6/2014 |
| KR | 10-2016-0049894 | A | 5/2016 |
| KR | 10-2016-0050871 | A | 5/2016 |
| KR | 10-2017-0028676 | A | 3/2017 |
| KR | 10-2019-0058708 | A | 5/2019 |
| KR | 10-2021-0106962 | A | 8/2021 |

OTHER PUBLICATIONS

Li et al. ACS Appl. Mater. Interfaces 2021, 13, 26023-26033. (Year: 2021).*

International Search Report of PCT/KR2022/004778, Aug. 18, 2022, 3pp.

European Search Report for EP Application No. 22877678.7 dated Mar. 11, 2025, 6 pages.

* cited by examiner

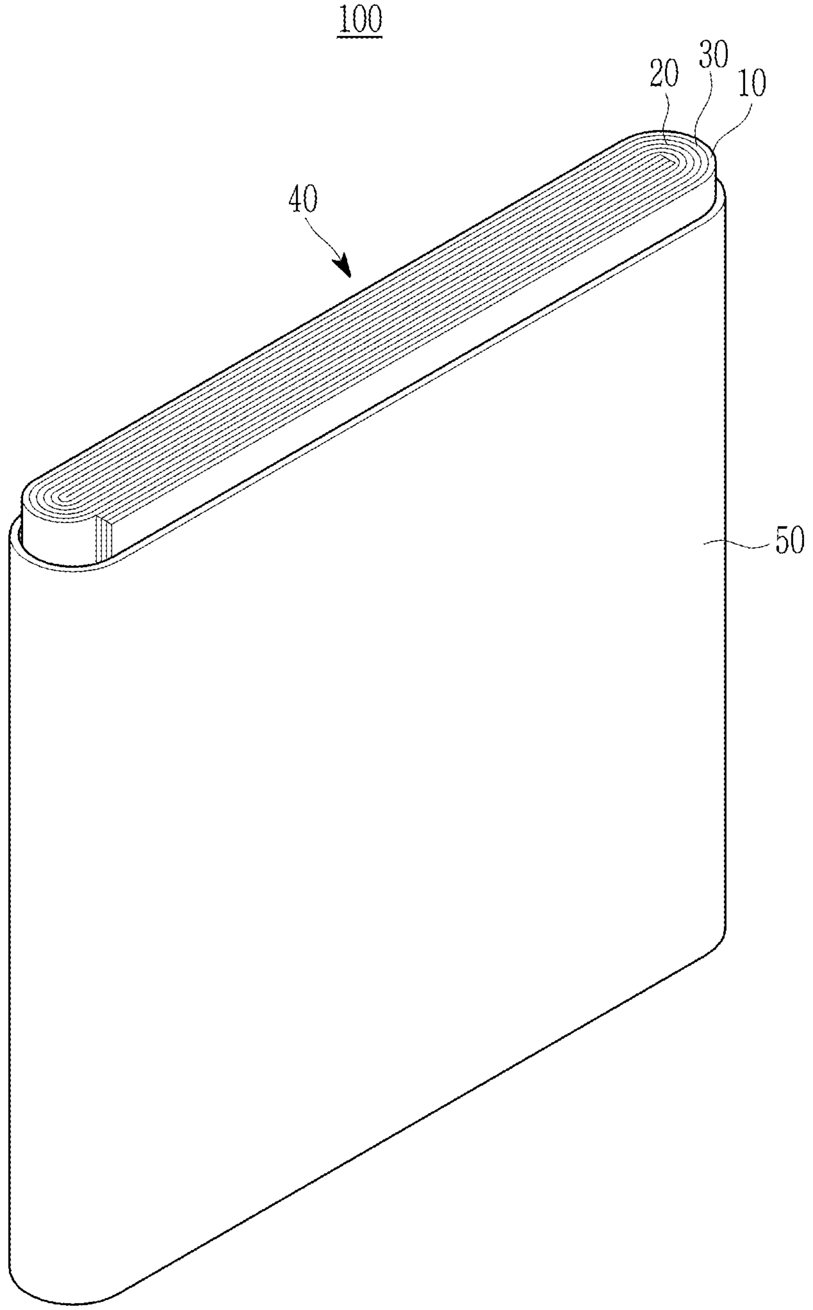
100
20
30
10
40
50

NON-AQUEOUS ELECTROLYTE FOR RECHARGEABLE LITHIUM BATTERY AND RECHARGEABLE LITHIUM BATTERY COMPRISING SAME

CROSS-REFERENCE TO RELATED APPLICATION(S)

This application is a National Phase Patent Application of International Patent Application Number PCT/KR2022/004778, filed on Apr. 4, 2022, which claims priority of Korean Patent Application No. 10-2021-0166123, filed Nov. 26, 2021. The entire contents of both of which are incorporated herein by reference.

TECHNICAL FIELD

It relates a non-aqueous electrolyte for a lithium secondary battery and a lithium secondary battery including the same.

BACKGROUNND ART

Lithium secondary batteries are attracting attention as power sources for various electronic devices because of high discharge voltage and high energy density.

As for positive active materials of lithium secondary batteries, a lithium-transition metal oxide having a structure capable of intercalating lithium ions such as $LiCoO_2$, $LiMn_2O_4$, $LiNi_{1-x}Co_xO_2$ ($0<x<1$), and the like has been used.

As for negative active materials, various carbon-based materials such as artificial graphite, natural graphite, and hard carbon capable of intercalating and deintercalating lithium ions have been used. As electrolytes for a lithium secondary battery, organic solvents in which lithium salts are dissolved has been used.

TECHNICAL PROBLEM

One embodiment provides a non-aqueous electrolyte for a lithium secondary battery suppressing increases in battery resistance at a high temperature storage, thereby improving the battery performances and the cycle-life characteristics at a room temperature.

Another embodiment provides a lithium secondary battery including the non-aqueous electrolyte.

TECHNICAL SOLUTION

According to one embodiment, a non-aqueous electrolyte for a lithium secondary battery including a non-aqueous organic solvent; a lithium salt; and an additive represented by Chemical Formula 1.

[Chemical Formula 1]

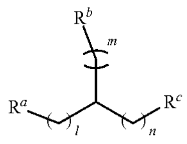

(In Chemical Formula 1, l, m, and n are each an integer from 0 to 10, provided that at least one of l, m, and n is an integer from 1 to 10, and $R^a$, $R^b$, and $R^c$ are each hydrogen or SCN, provided that at least two of $R^a$, $R^b$, and $R^c$ are SCN.)

In one embodiment, the l, m, and n are each an integer from 0 to 6, provided that at least one of l, m, and n may be an integer from 1 to 5. In another embodiment, the l, m, and n are each an integer from 0 to 3, provided that at least one of l, m, and n may be an integer from 1 to 3, and the l, m, and n are each an integer from 0 to 2, provided that at least one of l, m, and n may be an integer from 1 to 2.

An amount of the additive may be 0.1 parts by weight to 3 parts by weight based on the total, 100 parts by weight of the non-aqueous electrolyte.

The additive may be at least one represented by Chemical Formulas 1a to 1e.

[Chemical Formula 1a]

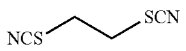

[Chemical Formula 1b]

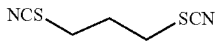

[Chemical Formula 1c]

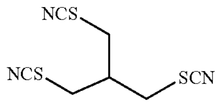

[Chemical Formula 1d]

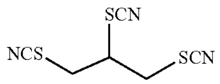

[Chemical Formula 1e]

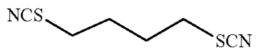

The electrolyte may further include one additive for improving cycle-life selected from fluoroethylene carbonate, difluoro ethylene carbonate, chloroethylene carbonate, dichloroethylene carbonate, bromoethylene carbonate, dibromoethylene carbonate, nitroethylene carbonate, or cyanoethylene carbonate; at least one additional additive selected from vinyl ethylene carbonate (VEC), adiponitrile (AN), succinonitrile (SN), 1,3,6-hexane tricyanide (HTCN), propene sultone (PST), propane sultone (PS), lithium tetrafluoroborate ($LiBF_4$), lithium difluorophosphate ($LiPO_2F_2$), or 2-fluoro biphenyl (2-FBP) ; or combinations thereof.

Another embodiment provides a lithium secondary battery including the non-aqueous electrolyte; a positive electrode including a positive active material comprising a lithium, nickel and cobalt; and a negative electrode including a negative active material.

The positive active material may be represented by Chemical Formula 2.

$$Li_aNi_xCO_yM1_zM2_wO_{2-b}X_b \quad \text{[Chemical Formula 2]}$$

(In Chemical Formula 2, $0.9 \leq a < 1.2$, $0 \leq b < 0.1$, $0 \leq w < 0.1$, $0.5 \leq x \leq 1$, $0 \leq y \leq 0.5$, $0 \leq z \leq 0.5$, $w+x+y+z=1$, M1 is at least one element selected from Al or Mn, M2 is at least one element selected from B, Ba, Ca, Ce, Cr, Fe, Mg, Mn, Mo, Nb, Si, Sr, Ti, V, W, or Zr, and X is at least one element selected from S, F, or P.)

The negative active material may be graphite, or may include a Si composite and graphite.

In one embodiment, the Si composite may include a core including Si-based particles and an amorphous carbon coating layer. The Si-based particle may include at least one of a Si—C composite, $SiO_x$ ($0<x\leq2$) and a Si alloy.

In another embodiment, the Si—C composite may include a core including Si particles and crystalline carbon and an amorphous carbon coating layer positioned on the surface of the core and the Si particle may have an average particle diameter of 50 nm to 200 nm.

Other embodiments are included in the following detailed description.

ADVANTAGEOUS EFFECTS

An electrolyte for a lithium secondary battery may suppress increases in battery resistance at a high temperature storage, thereby improving the battery performances and improving the cycle-life characteristics at a room temperature.

BRIEF DESCRIPTION OF THE DRAWINGS

FIG. 1 is a schematic view of a lithium secondary battery according to an embodiment.

MODE FOR INVENTION

Hereinafter, embodiments of the present invention are described in detail. However, these embodiments are exemplary, the present invention is not limited thereto and the present invention is defined by the scope of claims.

A non-aqueous electrolyte for a lithium secondary battery includes a non-aqueous organic solvent; a lithium salt; and an additive represented by Chemical Formula 1.

[Chemical Formula 1]

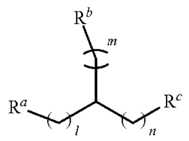

In Chemical Formula 1, l, m, and n are each an integer from 0 to 10, provided that at least one of l, m, and n is an integer from 1 to 10.

In Chemical Formula 1, a main chain only consists of C and H, except for an ending functional group, $R_a$, $R_b$, and $R_c$.

According to one embodiment, m, l, and n are each an integer of 0 to 5, but at least one of l, m, and n may be an integer of 1 to 5. According to another embodiment, l, m, and n are each an integer from 0 to 3, provided that at least one of l, m, and n may be an integer from 1 to 3.

According to another embodiment, m, l, and n are each an integer from 0 to 2, provided that at least one of l, m, and n may be an integer from 1 to 2.

In Chemical Formula 1, $R^a$, $R^b$, and $R^c$ are each hydrogen or SCN, provided that at least two of $R^a$, $R^b$, and $R^c$ are SCN.

The additive may be at least one represented by Chemical Formulas 1a to 1e.

[Chemical Formula 1a]

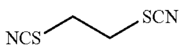

[Chemical Formula 1b]

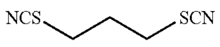

-continued

[Chemical Formula 1c]

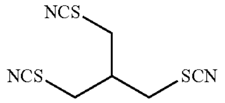

[Chemical Formula 1d]

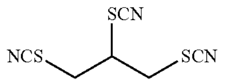

[Chemical Formula 1e]

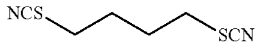

In one embodiment, the additive is represented by Chemical Formula 1 of which a bonding group between carbon and SCN of a main chain is an unsubstituted alkyl, and it may reduce internal resistance compared to that with a substituted alkyl. If it includes a substituted alkyl or a functional group including hetero elements such as alkoxy, internal resistance may be increased.

In addition, the additive includes two or more SCN at a terminal end and an inclusion of two or more SCN may occur to more effectively complexation to an active reaction site of the positive electrode and may effectively reduce the oxidation decomposition of the electrolyte. Furthermore, the electrolyte reacts with the positive active material to thinly form a generated CEI (cathode electrolyte interphase) film, thereby inhibiting damage by gas generation and an elution of metal elute, so that the safety of a high voltage positive active material may be secured and the battery performances may be improved. Regardless of inclusion of SCN, if it includes one SCN, resistance may be increased at a high temperature storage, cycle-life may be decreased, and gas generation at a high temperature storage may be increased. Furthermore, if it includes two or more of CN without sulfur, an internal resistance may be undesirably increased.

In one embodiment, an amount of the additive may be 0.1 parts by weight to 2 parts by weight, 0.3 parts by weight to 2 parts by weight, 0.3 parts by weight to 1.5 parts by weight, 0.3 parts by weight to 1 part by weight, or 0.5 parts by weight to 1 part by weight based on the total, 100 parts by the non-aqueous electrolyte. When the additive is within the range, the effects using the additive may be suitably obtained.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or combinations thereof. The ester-based solvent may include methyl acetate, ethyl acetate, n-propyl acetate, t-butyl acetate, methyl propionate, ethyl propionate, propyl propionate, γ-butyrolactone, decanolide, valerolactone, mevalonolactone, caprolactone, and the like. @@@γ-부티로락톤

The ether-based solvent may include dibutyl ether, tetraglyme, diglyme, dimethoxyethane, 2-methyltetrahydrofuran, tetrahydrofuran, and the like, and the ketone-based solvent may include cyclohexanone, and the like.

In addition, the alcohol-based solvent may include ethyl alcohol, isopropyl alcohol, and the like, and examples of the aprotic solvent may include nitriles such as T-CN (where T is a C2 to C20 linear, branched, or cyclic hydrocarbon, or may include a double bond, an aromatic ring, or an ether bond), amides such as dimethylformamide, dioxolanes such as 1,3-dioxolane, sulfolanes, and the like.

The organic solvent may be used alone or in a mixture. When the organic solvent is used in a mixture, the mixture ratio may be controlled in accordance with a desirable battery performance and it may be well understood to one of ordinary skill in the related art.

Furthermore, the carbonate-based solvent may include a mixture of a cyclic carbonate and a linear carbonate. Herein, when the mixture of cyclic carbonate and linear carbonate mixed together in a volume ratio of 1:1 to 1:9 is used as an electrolyte, it may have enhanced performance.

The non-aqueous organic solvent may further include an aromatic hydrocarbon-based organic solvent in addition to the carbonate-based solvent. Herein, the carbonate-based solvent and the aromatic hydrocarbon-based organic solvent may be mixed at a 1:1 to 30:1 by volume ratio.

The aromatic hydrocarbon-based organic solvent may be an aromatic hydrocarbon-based compound of Chemical Formula 3.

[Chemical Formula 3]

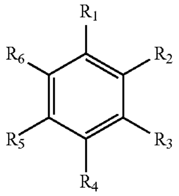

(In Chemical Formula 3, $R_1$ to $R_6$ are the same or different and are selected from hydrogen, a halogen, a C1 to C10 alkyl group, a haloalkyl group, and a combination thereof.)

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, and 2,5-diiodotoluene.

The electrolyte may further include an ethylene carbonate-based compound of Chemical Formula 4, as an additive for improving a cycle-life in order to improve the cycle-life characteristics.

[Chemical Formula 4]

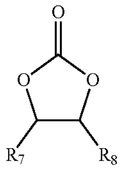

(In Chemical Formula 4, $R_7$ and $R_8$ are the same or different, and are selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, and $R_7$ and $R_8$ are not hydrogen.)

Examples of the ethylene carbonate-based compound may include fluoroethylene carbonate, difluoro ethylene carbonate, chloroethylene carbonate, dichloroethylene carbonate, bromoethylene carbonate, dibromoethylene carbonate, nitroethylene carbonate, cyanoethylene carbonate, and the like.

The electrolyte may further include at least one additional additive selected from vinyl ethylene carbonate (VEC), adiponitrile (AN), succinonitrile (SN), 1,3,6-hexane tricyanide (HTCN), propene sultone (PST), propane sultone (PS), lithium tetrafluoroborate ($LiBF_4$), lithium difluorophosphate ($LiPO_2F_2$), and 2-fluoro biphenyl (2-FBP).

When the electrolyte further includes the additive for improving cycle-life or the additional additive, the amount thereof may be 1 part by weight to 20 parts by weight based on the total, 100 parts by weight of the electrolyte, but is not limited thereto.

The lithium salt dissolved in an organic solvent supplies a battery with lithium ions, basically operates the lithium secondary battery, and improves transportation of the lithium ions between positive and negative electrodes. Examples of the lithium salt include one or two or more supporting salt selected from $LiPF_6$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiCSI), $LiC_4F_9SO_3$, $LiClO_4$, $LiAlO_2$, $LiAlCl_4$, $LiN(C_xF_{2x+1}SO_2)(C_yF_{2y+1}SO_2)$, wherein x and y are natural numbers, for example an integer ranging from 1 to 20, lithium difluoro(bisoxalato) phosphate), LiCl, LiI, $LiB(C_2O_4)_2$ (lithium bis(oxalato) borate: LiBOB), and lithium difluoro(oxalato) borate: LiDFOB). A concentration of the lithium salt may range from 0.1 M to 2.0 M. When the lithium salt is included at the above concentration range, an electrolyte may have excellent performance and lithium ion mobility due to optimal electrolyte conductivity and viscosity.

When the non-aqueous electrolyte including the additive for the lithium secondary battery is applied into a lithium secondary battery using a compound including lithium, nickel, and cobalt as a positive active material, it may be more effective. The shortcomings such as resistance increases and capacity fading derived from the positive active material including nickel and cobalt has may be effectively solved by effectively suppressing resistance increases using an electrolyte including the additive represented by Chemical Formula 1 and by mainly positioning the additive on the surface of the positive active material, thereby more effectively suppressing the decomposition of the electrolyte.

The compound including lithium, nickel, and cobalt according to one embodiment may be represented by Chemical Formula 2.

$$Li_aNi_xCo_yM1_zM2_wO_{2-b}X_b$$ [Chemical Formula 2]

In Chemical Formula 2, $0.9 \le a < 1.2$, $0 \le b < 0.1$, $0 \le w < 0.1$, $0.5 \le x \le 1$, $0 \le y \le 0.5$, $0 \le z \le 0.5$, $w+x+y+z=1$, M1 is at least one element selected from Al or Mn, M2 is at least one element selected from B, Ba, Ca, Ce, Cr, Fe, Mg, Mn, Mo, Nb, Si, Sr, Ti, V, W, or Zr, and X is at least one element selected from S, F, or P.

According to one embodiment, the x may be 0.6≤y≤1.

The Chemical Formula 2 may be represented by Chemical Formula 2-1.

$Li_aNi_{x1}Co_{y1}Al_{z1}M2_{w1}O_{2-b}X_b$ [Chemical Formula 2-1]

In Chemical Formula 2-1, 0.9≤a<1.2, 0≤b<0.1, 0≤w1<0.1, 0.5≤x1≤1, 0≤y1≤0.5, 0≤z1≤0.5, w1+x1+y1+z1=1, M2 is at least one element selected from B, Ba, Ca, Ce, Cr, Fe, Mg, Mn, Mo, Nb, Si, Sr, Ti, V, W, or Zr, and X is at least one element selected from S, F, or P.

In Chemical Formula 2-1, x1 may be 0.6≤x1≤0.9, y1 may be 0.1≤y1≤0.3, z1 may be 0.01≤z1<0.1, w1 and b may be 0, and x1+y1+z1=1.

As such, the lithium secondary battery including the electrolyte according to one embodiment includes the electrolyte, the positive electrode including the positive active material, and a negative electrode.

The positive electrode includes a current collector, and a positive active material layer formed on the current collector and including the positive active material.

In the positive active material layer, an amount of the positive active material may be 90 wt % to 98 wt % based on the total weight of the positive active material layer.

In one embodiment, the positive active material layer may further include a binder and a conductive material. Herein, the amount of the binder and the conductive material may be 1 wt % to 5 wt %, respectively based on the total amount of the positive active material layer.

The binder improves binding properties of positive electrode active material particles with one another and with a current collector, and examples of the binder may be polyvinyl alcohol, carboxymethyl cellulose, hydroxypropyl cellulose, diacetyl cellulose, polyvinyl chloride, carboxylated polyvinyl chloride, polyvinyl fluoride, an ethylene oxide-containing polymer, polyvinyl pyrrolidone, polyurethane, polytetrafluoroethylene, polyvinylidene fluoride, polyethylene, polypropylene, styrene-butadiene rubber, acrylated styrene-butadiene rubber, an epoxy resin, nylon, and the like, but is not limited thereto.

The conductive material is included to provide electrode conductivity, and any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may use aluminum foil, nickel foil, or a combination thereof, but is not limited thereto.

The negative electrode includes a current collector and a negative active material layer formed on the current collector and including the negative active material.

The negative active material includes a material that reversibly intercalates/deintercalates lithium ions, a lithium metal, a lithium metal alloy, a material capable of doping/dedoping lithium, or a transition metal oxide.

The material that reversibly intercalates/deintercalates lithium ions may be a carbon material, that is, a generally-used carbon-based negative active material used in a lithium secondary battery. Examples of the carbon-based negative active material may be crystalline carbon, amorphous carbon, or a combination thereof. The crystalline carbon may be unspecified shaped, sheet, flake, spherical, or fiber shaped natural graphite or artificial graphite, and the amorphous carbon may be a soft carbon, a hard carbon, a mesophase pitch carbonization product, fired coke, and the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be a silicon-based material or a Sn-based active material. Examples thereof may be Si, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), a Si-carbon composite, Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, and not Sn), a Sn-carbon composite, and the like, and at least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide includes a lithium titanium oxide.

The negative active material according to one embodiment may be a crystalline carbon. In addition, the negative active material may further include a Si composite together with crystalline carbon.

The negative active material may include both the Si—C composite and crystalline carbon in a mixture of the Si—C composite and crystalline carbon, and herein, the Si composite and crystalline carbon may be included at a 1:99 to 50:50 by weight ratio. More specifically, the Si—C composite and crystalline carbon may be included at 3:97 to 20:80 by weight ratio.

The Si composite may include a core including Si-based particles and an amorphous carbon coating layer. According to one embodiment, the Si composite may also include a core including Si-based particles and crystalline carbon and an amorphous carbon coating layer positioned on the core.

The Si-based active material은 Si, $SiO_x$ (0<x<2), Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), or combinations thereof. If the Si-based particle is $SiO_x$ or Si-Q alloy, Si may be further included.

In the Si—C composite, the Si-based active material may have an average particle diameter of 50 nm to 200 nm.

When the particle diameter of the Si particle is within the range, the volume expansion caused during charge and discharge may be suppressed, and a breakage of the conductive path due to crushing of particle may be prevented.

The Si particle may be included in an amount of 1 wt % to 60 wt % based on the total weight of the Si—C composite, for example, 3 wt % to 60 wt %.

The crystalline carbon, may include, for example, graphite, and more specifically, natural graphite, artificial graphite, or a mixture thereof. The crystalline carbon may have an average particle diameter of 5 μm to 30 μm.

In the specification, an average particle diameter refers to a particle diameter (D50) where a cumulative volume is 50 volume % in a cumulative size-distribution curve).

The Si—C composite may further include a shell surrounded on the surface of the Si—C composite, and the shell may include amorphous carbon. A thickness of the shell may be 5 nm to 100 nm.

The amorphous carbon may include soft carbon, hard carbon, mesophase pitch carbide, sintered cokes, or a mixture thereof.

The amorphous carbon may be included in an amount of 1 part by weight to 50 parts by weight based on 100 parts by weight of the carbon-based active material, for example, 5 parts by weight to 50 parts by weight, or 10 parts by weight to 50 parts by weight.

The negative active material layer includes a negative active material and a binder, and may optionally include a conductive material.

In the negative active material layer, an amount of the negative active material may be 95 wt % to 99 wt % based on the total weight of the negative active material layer. In the negative active material layer, an amount of the binder may be 1 wt % to 5 wt % based on the total weight of the negative active material layer. Furthermore, in case of further including the conductive material, the negative active material may be included in an amount of 90 wt % to 98 wt %, the binder may be included in an amount of 1 wt % to 5 wt %, and the conductive material may be included in an amount of 1 wt % to 5 wt %.

The binder improves binding properties of anode active material particles with one another and with a current collector. The binder may be a non-aqueous binder, an aqueous binder, or a combination thereof.

The non-aqueous binder may be an ethylene propylene copolymer, polyacrylonitrile, polystyrene, polyvinylchloride, carboxylated polyvinylchloride, polyvinylfluoride, polyurethane, polytetrafluoroethylene, polyvinylidene fluoride, polyethylene, polypropylene, polyamideimide, polyimide, or combinations thereof.

The aqueous binder may include a styrene-butadiene rubber, an acrylated styrene-butadiene rubber, an acrylonitrile-butadiene rubber, an acrylic rubber, a butyl rubber, a fluorine rubber, an ethylene oxide-containing polymer, polyvinyl pyrrolidone, polyepichlorohydrin, polyphosphazene, an ethylene propylene diene copolymer, polyvinyl pyridine, chlorosulfonated polyethylene, latex, a polyester resin, an acrylic resin, a phenol resin, an epoxy resin, polyvinyl alcohol, or combinations thereof.

When the aqueous binder is used as a negative electrode binder, a cellulose-based compound may be further used to provide viscosity as a thickener. The cellulose-based compound includes one or more of carboxymethyl cellulose, hydroxypropyl methyl cellulose, methyl cellulose, or alkali metal salts thereof. The alkali metal may be Na, K, or Li. The thickener may be included in an amount of 0.1 parts by weight to 3 parts by weight based on 100 parts by weight of the negative active material.

The conductive material is included to provide electrode conductivity, and any electrically conductive material may be used as a conductive material unless it causes a chemical change. Examples of the conductive material may be a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof, but is not limited thereto.

The positive active material layer and the negative active material layer may be formed by mixing an active material, binder, and optionally a conductive material in a solvent to prepare an active material composition and coating the active material composition on a current collector. Such an active material layer preparation method is well known and thus is not described in detail in the present specification. The solvent includes N-methyl pyrrolidone and the like, but is not limited thereto. In addition, when the binder is a water-soluble binder in the negative active material layer, the solvent used for preparing the negative active material composition may be water.

Furthermore, a separator may be also disposed between the positive electrode and the negative electrode depending on a type of a rechargeable lithium battery. The separator may use polyethylene, polypropylene, polyvinylidene fluoride or multi-layers thereof having two or more layers and may be a mixed multilayer such as a polyethylene/polypropylene double-layered separator, a polyethylene/polypropylene/polyethylene triple-layered separator, a polypropylene/polyethylene/polypropylene triple-layered separator, and the like.

FIG. 1 is an exploded perspective view of a rechargeable lithium battery according to an embodiment of the present invention. The lithium secondary battery according to an embodiment is illustrated as a prismatic battery, but is not limited thereto and may include variously-shaped batteries such as a cylindrical battery, a pouch battery.

Referring to FIG. 1, a rechargeable lithium battery 100 according to an embodiment includes an electrode assembly 40 manufactured by winding a separator 30 interposed between a positive electrode 10 and a negative electrode 20, and a case 50 housing the electrode assembly 40. An electrolyte (not shown) may be impregnated in the positive electrode 10, the negative electrode 20, and the separator 30.

MODE FOR PERFORMING THE INVENTION

Hereinafter, examples of the present invention and comparative examples are described. These examples, however, are not in any sense to be interpreted as limiting the scope of the invention.

Example 1

1.5 M $LiPF_6$ was dissolved in a non-aqueous organic solvent in which ethylene carbonate, ethyl methyl carbonate, and dimethyl carbonate were mixed at a 20:10:70 by volume % to prepare a mixed liquid, and fluoroethylene carbonate and an additive of Chemical Formula 1a were added to the mixed liquid, thereby preparing an electrolyte for a lithium secondary battery.

[Chemical Formula 1a]

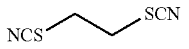

Herein, an amount of fluoroethylene carbonate was used to be 3 parts by weight based on 100 parts by weight of the electrolyte for the lithium secondary battery, and the amount of the additive of Chemical Formula 1a was used to be 0.5 parts by weight based on 100 parts by weight of the electrolyte for the lithium secondary battery.

96 wt % of a $LiNi_{0.88}Co_{0.105}Al_{0.015}O_2$ positive active material, 2 wt % of a ketjen black conductive material, and 2 wt % of polyvinylidene fluoride were mixed in an N-methylpyrrolidone solvent to prepare a positive active material slurry. The positive active material slurry was coated in an aluminum foil, dried and pressurized to prepare a positive electrode.

A negative active material in which natural graphite (average particle diameter D50: 5 μm) and a Si—C composite were mixed at 89:11 by weight ratio, and a styrene-butadiene rubber binder, and carboxymethyl cellulose were mixed at a 98:1:1 by weight ratio and distributed in distilled water to prepare a negative active material slurry.

Herein, the Si-carbon composite includes a core including artificial graphite and silicon particles and a soft carbon coated on the surface of the core, and an amount of artificial graphite was 40 wt %, an amount of the silicon particles was 40 wt %, and an amount of the amorphous carbon was 20 wt % based on the total weight of the Si-carbon composite. The soft carbon coating layer had a thickness of 20 nm, and the silicon particle had an average particle diameter D50 of 100 nm.

The negative active material slurry was coated on a copper foil, dried, followed by pressurizing to prepare a negative electrode.

Using the electrolyte, the positive electrode, and the negative electrode, a 4.2 V grade cylindrical lithium secondary cell was fabricated according to the convention procedure.

Example 2

An electrolyte was prepared by the same procedure as in Example 1, except that 1.0 parts by weight of the compound represented by Chemical Formula 1a was used as the additive, instead of using 0.5 parts by weight of the compound represented by Chemical Formula 1a.

[Chemical Formula 1a]

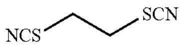

Using the electrolyte and the positive electrode and the negative electrode of Example 1, a 4.2 V grade cylindrical lithium secondary cell was fabricated by the same procedure as in Example 1.

Comparative Example 1

A 4.2 V grade cylindrical lithium secondary cell was fabricated by the same procedure as in Example 1, except that an electrolyte using no additive of Chemical Formula 1, that is, an electrolyte in which 1.5M $LiPF_6$ was dissolved in a mixed non-aqueous organic solvent of ethylene carbonate, ethyl methyl carbonate, and dimethyl carbonate at a 20:10:70 by volume % and 3 parts by weight of fluoroethylene carbonate was added thereto, was used.

Comparative Example 2

An electrolyte was prepared by the same procedure as in Example 1, except that 1.0 parts by weight of hexane tricyanide (HTCN) was used as the additive, instead of using the compound represented by Chemical Formula 1a. Using the electrolyte and the positive electrode and the negative electrode of Example 1, a 4.2 V grade cylindrical lithium secondary cell was fabricated by the same procedure as in Example 1.

Comparative Example 3

An electrolyte was prepared by the same procedure as in Comparative Example 2, except that 1.0 parts by weight of a compound of Chemical Formula 5 was used as the additive, instead of using hexane tricyanide. Using the electrolyte and the positive electrode and the negative electrode of Example 1, a 4.2 V grade cylindrical lithium secondary cell was fabricated by the same procedure as in Example 1.

[Chemical Formula 5]

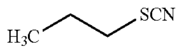

Experimental Example 1) Evaluation of DC internal resistance (DC-IR: Direct current internal resistance)

The lithium secondary cells according to Examples 1 and 2, and Comparative Examples 1 to 3 was constant-discharged at 10 A for 10 seconds under a SOC100 (state of chare, fully charged state, charge to be 100% of charge capacity based on 100% of the entire battery charge capacity) at 60° C., constant-discharged at 10 A for 10 seconds, constant-discharged at 1 A for 10 seconds, and constant-discharged at 10 A for 4 seconds, a voltage value and a current value were measured right before storage, and furthermore, the cell was stored at 60° C. for 30 days, and then a voltage value and a current value were measured.

The DC resistance (DC-IR) was calculated from the data at 18 seconds and 23 seconds by the equation $\Delta R=\Delta V/\Delta I$ (difference from resistance at a point of 18 seconds to resistance at a point of 23 seconds). That is, it was obtained from (voltage measured after 10 A for 10 seconds discharge, 1 A for 10 seconds discharge, and 10 A for 3 seconds discharge-voltage measured after 10 A for 10 seconds discharge and 1 A for 8 seconds discharge)/current after 10 A for 10 seconds discharge and 8 seconds discharge.

The DCIR resistance increase rate was calculated from the DC resistance just before storage and the DC resistance after 30 days by Equation 1. The results are shown in Table 1.

$$\text{DCIR increase rate}=[\text{DCIR } 30d.-\text{DCIR } (0\ d.)]/\text{DCIR } (0\ d.)\times 100\% \quad \text{[Equation 1]}$$

TABLE 1

| | Additive | Amount of additive (parts by weight) | Initial DC-IR (mΩ) | DC-IR after storage at 60° C. for 30 days: DC-IR (mΩ) | DC-IR after storage at 60° C. for 30 days: DC-IR increase rate (%) |
|---|---|---|---|---|---|
| Comparative Example 1 | — | 0 | 2.94 | 4.61 | 56.80 |
| Comparative Example 2 | HTCN | 1 | 2.90 | 4.51 | 55.5 |
| Comparative Example 3 | Chemical Formula 5 | 1 | 3.19 | 4.59 | 43.9 |

TABLE 1-continued

| | Additive | Amount of additive (parts by weight) | Initial DC-IR (mΩ) | DC-IR after storage at 60° C. for 30 days | |
|---|---|---|---|---|---|
| | | | | DC-IR (mΩ) | DC-IR increase rate (%) |
| Example 1 | Chemical Formula 1a | 0.5 | 3.14 | 4.37 | 39.17 |
| Example 2 | Chemical Formula 1a | 1 | 3.16 | 4.50 | 42.4 |

As shown in the Table 1, the lithium secondary cells according to Examples 1 and 2 using the electrolyte including the additive of Chemical Formula 1 a exhibited a lower DC-IR increase rate at high-temperature storage than Comparative Example 1 using the electrolyte with no additive, which indicated excellent effects for reducing the resistance increase.

In addition, Comparative Examples 2 and 3 using the electrolyte including HTCN as the additive, or including the compound of Chemical Formula 5 with one SCN, exhibited a higher resistance increase rate than the examples.

Experimental Example 2) Evaluation of Cycle-Life Characteristic

The lithium secondary cells according to Examples 1 and 2 and Comparative Examples 1 to 3 were charged and discharged from 200 cycles under the condition of constant current-constant voltage at 1 C, 4.2 V, and a 0.05 C cutoff charging and constant current at 1.0 C and 3.0 V discharging at 45° C., to measure a discharge capacity, and then a ratio (capacity retention) of capacity at 200 cycles to discharge capacity at the 1st cycle, thereby producing the results as recovery capacity in Table 2.

TABLE 2

| | Recovery capacity (%) |
|---|---|
| Comparative Example 1 | 93.9 |
| Comparative Example 2 | 94.2 |
| Comparative Example 3 | 93.5 |
| Example 1 | 95.5 |
| Example 2 | 94.8 |

As shown in Table 2, the lithium secondary cells according to Examples 1 and 2 using the electrolyte including the additive of Chemical Formula 1a exhibited excellent recovery capacity.

Whereas Comparative Example 1 using the electrolyte with no additive, Comparative Example 2 using the electrolyte including HTCN, and Comparative Example 5 using the electrolyte including the compound of Chemical Formula 5 with one SCN exhibited deteriorated recovery capacity.

Experimental Example 3: Evaluation of Gas Generation at High Temperature

The lithium secondary cells according to Examples 1 and 2, and Comparative Examples 1 to 3 were allowed to stand at 60° C. for 7 days. Herein, the generated amount of gas (ml) after 1 day, 3 days, and 7 days were respectively measured by Refinery Gas Analysis (RGA). The results are shown in Table 3.

TABLE 3

| | Generated amount of gas at high temperature (ml) | | |
|---|---|---|---|
| | 1 day | 3 days | 7 days |
| Comparative Example 1 | 0.031 | 0.039 | 0.045 |
| Comparative Example 2 | 0.026 | 0.035 | 0.040 |
| Comparative Example 3 | 0.030 | 0.038 | 0.048 |
| Example 1 | 0.027 | 0.031 | 0.035 |
| Example 2 | 0.029 | 0.032 | 0.039 |

As shown in Table 3, the lithium secondary cells according to Examples 1 and 2 using the electrolyte including the additive of Chemical Formula 1a effectively exhibited reduced gas generation at a high temperature, compared to Comparative Example 1 using no additive.

Whereas, in case of Comparative Examples 2 and 3 using the electrolyte including HTCN as the additive, or including the compound of Chemical Formula 5 with one SCN, the reduction in gas generation was insignificantly exhibited.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be examples but not limiting the present invention in any way.

The invention claimed is:

1. A non-aqueous electrolyte for a lithium secondary battery, comprising:

a non-aqueous organic solvent;

a lithium salt; and an additive represented by Chemical Formula 1

[Chemical Formula 1]

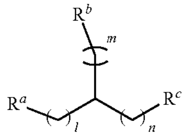

in Chemical Formula 1, l, m, and n are each an integer from 0 to 10, provided that at least one of I, m, and n is an integer from 1 to 10, and $R^a$, $R^b$, and $R^c$ are each hydrogen or SCN, provided that at least two of $R^a$, $R^b$, and $R^c$ are SCN, wherein for each of l, m, and n that is 0, the corresponding $R^a$, $R^b$, or $R^c$ is not SCN.

2. The non-aqueous electrolyte for a lithium secondary battery of claim 1, wherein an amount of the additive is 0.1 parts by weight to 3 parts by weight based on the total, 100 parts by weight, of the non-aqueous electrolyte.

3. The non-aqueous electrolyte for a lithium secondary battery of claim 1, wherein the l, m, and n are each an integer of 0 to 5, but at least one of l, m, and n is an integer of 1 to 5.

4. The non-aqueous electrolyte for a lithium secondary battery of claim 1, wherein the l, m, and n are each an integer from 0 to 3, provided that at least one of l, m, and n is an integer from 1 to 3.

5. The non-aqueous electrolyte for a lithium secondary battery of claim 1, wherein the l, m, and n are each an integer from 0 to 2, provided that at least one of l, m, and n is an integer from 1 to 2.

6. The non-aqueous electrolyte for a lithium secondary battery of claim 1, wherein the electrolyte further includes one additive for improving cycle-life selected from fluoroethylene carbonate, difluoro ethylene carbonate, chloroethylene carbonate, dichloroethylene carbonate, bromoethylene carbonate, dibromoethylene carbonate, nitroethylene carbonate, or cyanoethylene carbonate; at least one additional additive selected from vinyl ethylene carbonate (VEC), adiponitrile (AN), succinonitrile (SN), 1,3,6-hexane tricyanide (HTCN), propene sultone (PST), propane sultone (PS), lithium tetrafluoroborate ($LiBF_4$), lithium difluorophosphate ($LiPO_2F_2$), or 2-fluoro biphenyl (2-FBP); or combinations thereof.

7. A lithium secondary battery, comprising:

the non-aqueous electrolyte of claim 1;

a positive electrode comprising a positive active material comprising lithium, nickel and cobalt; and a negative electrode comprising a negative active material.

8. The lithium secondary battery of claim 7, wherein the positive active material is represented by Chemical Formula 2.

$$Li_aNi_xCo_yM1_zM2_wO_{2-b}X_b$$ [Chemical Formula 2]

In Chemical Formula 2, $0.9 \le a < 1.2$, $0 \le b < 0.1$, $0 \le w < 0.1$, $0.5 \le x \le 1$, $0 \le y \le 0.5$, $0 \le z \le 0.5$, $w+x+y+z=1$, M1 is at least one element selected from Al or Mn, M2 is at least one element selected from B, Ba, Ca, Ce, Cr, Fe, Mg, Mn, Mo, Nb, Si, Sr, Ti, V, W, or Zr, and X is at least one element selected from S, F, or P.

9. The lithium secondary battery of claim 7, wherein the negative active material includes crystalline carbon, or includes a Si composite and crystalline carbon.

10. The lithium secondary battery of claim 9, wherein the Si composite comprises a core comprising Si-based particles and an amorphous carbon coating layer.

11. The lithium secondary battery of claim 10, wherein the Si-based particle comprises at least one of a Si—C composite, $SiO_x$ ($0<x\le 2$) and a Si alloy.

12. The lithium secondary battery of claim 11, wherein the Si—C composite comprises a core comprising Si particles and crystalline carbon and an amorphous carbon coating layer positioned on the surface of the core, and the Si particle has an average particle diameter of 50 nm to 200 nm.

13. A non-aqueous electrolyte for a lithium secondary battery, comprising:

a non-aqueous organic solvent;

a lithium salt; and an additive being at least one represented by Chemical Formulas 1a to 1e:

[Chemical Formula 1a]

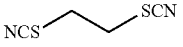

[Chemical Formula 1b]

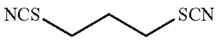

[Chemical Formula 1c]

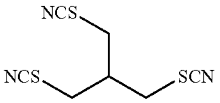

[Chemical Formula 1d]

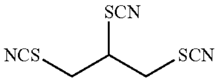

[Chemical Formula 1e]

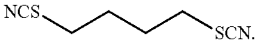

* * * * *